United States Patent
Kim

(10) Patent No.: US 12,500,254 B2
(45) Date of Patent: Dec. 16, 2025

(54) VALVE OPENING/CLOSING DETECTION DEVICE FOR FUEL CELL SYSTEM AND METHOD THEREFOR

(71) Applicants: Hyundai Motor Company, Seoul (KR); Kia Corporation, Seoul (KR)

(72) Inventor: Gyu Young Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 481 days.

(21) Appl. No.: 17/952,666

(22) Filed: Sep. 26, 2022

(65) Prior Publication Data

US 2023/0387436 A1 Nov. 30, 2023

(30) Foreign Application Priority Data

May 25, 2022 (KR) .................. 10-2022-0064201

(51) Int. Cl.
*H01M 8/04791* (2016.01)
*F16K 37/00* (2006.01)
(Continued)

(52) U.S. Cl.
CPC ..... *H01M 8/04798* (2013.01); *F16K 37/0041* (2013.01); *H01M 8/04089* (2013.01);
(Continued)

(58) Field of Classification Search
CPC ......... H01M 8/04798; H01M 8/04089; H01M 8/04597; H01M 8/04753; H01M 8/04231;
(Continued)

(56) References Cited

U.S. PATENT DOCUMENTS

| 8,105,730 B2 | 1/2012 | Katano et al. |
| 2010/0047663 A1* | 2/2010 | Manabe ............ H01M 8/04686 429/414 |

(Continued)

FOREIGN PATENT DOCUMENTS

| JP | 2005-011577 A | 1/2005 |
| JP | 2006-079891 A | 3/2006 |

(Continued)

OTHER PUBLICATIONS

English Translation of JP 2019145288A (Year: 2019).*

*Primary Examiner* — Stewart A Fraser
(74) *Attorney, Agent, or Firm* — Fox Rothschild LLP

(57) ABSTRACT

The present disclosure relates to a valve opening/closing detection device for a fuel cell system and a method therefor and provides a valve opening/closing detection device for a fuel cell system, which detects a current (current waveform) supplied to a valve of the fuel cell system, determines a differential value of the current, detects opening/closing of the valve on the basis of a fluctuation range of the differential value, and thus may accurately detect an opening time point and a closing time point of the valve without a separate sensor, and a method therefor. To this end, the present disclosure may include a current sensor that measures a current applied to a valve, and a controller that determines a differential value of the current and detects opening/closing of the valve on the basis of a fluctuation range of the differential value.

20 Claims, 9 Drawing Sheets

(51) Int. Cl.
   *H01M 8/04089*    (2016.01)
   *H01M 8/04537*    (2016.01)
   *H01M 8/04746*    (2016.01)

(52) U.S. Cl.
   CPC ... *H01M 8/04597* (2013.01); *H01M 8/04753* (2013.01); *H01M 2250/20* (2013.01)

(58) Field of Classification Search
   CPC ......... H01M 8/04388; H01M 8/04589; H01M 8/04447; H01M 8/04992; F16K 37/0041
   See application file for complete search history.

(56) References Cited

U.S. PATENT DOCUMENTS

| | | |
|---|---|---|
| 2015/0114357 A1 | 4/2015 | Fujino |
| 2016/0141686 A1* | 5/2016 | Maruo .............. H01M 8/04231 |
| | | 429/429 |
| 2018/0006319 A1* | 1/2018 | Asai ................. H01M 8/04201 |
| 2020/0036018 A1 | 1/2020 | Yamanaka et al. |
| 2022/0213978 A1* | 7/2022 | Choi .................... F16K 37/0025 |
| 2022/0320546 A1* | 10/2022 | Li ....................... H01M 8/0444 |

FOREIGN PATENT DOCUMENTS

| | | | |
|---|---|---|---|
| JP | 2008-128206 A | | 6/2008 |
| JP | 5862466 B2 | | 2/2016 |
| JP | 2019145288 A | * | 8/2019 |
| JP | 2020-017435 A | | 1/2020 |
| JP | 2020-060166 A | | 4/2020 |

* cited by examiner

VALVE OPENING/CLOSING DETECTION DEVICE FOR FUEL CELL SYSTEM AND METHOD THEREFOR

CROSS-REFERENCE TO RELATED APPLICATION

This application claims under 35 U.S.C. § 119(a) the benefit of Korean Patent Application No. 10-2022-0064201, filed in the Korean Intellectual Property Office on May 25, 2022, the entire contents of which are incorporated herein by reference.

TECHNICAL FIELD

The present disclosure relates to a technology for detecting opening and closing of a valve provided in a fuel cell system.

BACKGROUND

Fuel cell systems are a kind of power generation systems that directly convert chemical energy of fuel into electrical energy in a fuel cell stack in an electrochemical manner without converting the chemical energy of the fuel into heat by combustion.

To this end, the fuel cell system may include a fuel cell stack that generates electric energy, a hydrogen supply device that supplies hydrogen that is a fuel to the fuel cell stack, an air supply device that supplies air (oxygen) that is an oxidizing agent for an electrochemical reaction, a thermal management system (TMS) that discharges reaction heat of the fuel cell stack to the outside, controls an operating temperature of the fuel cell stack, and performs a water management function, and a control device that controls an overall operation of the fuel cell system.

The fuel cell system generates electricity by reacting to the hydrogen that is a fuel and the oxygen in the air and discharges heat and water as reaction byproducts.

Meanwhile, in situations such as reduced hydrogen concentration, increased nitrogen concentration, excessive current integration, stack reverse voltage, voltage imbalance, and excessive anode pressure, the fuel cell system opens a discharge valve to secure the concentration of the hydrogen inside an anode and control the pressure inside the anode.

When the discharge valve is opened, a condensate in a water trap located at a front end of the discharge valve is discharged, and the fuel cell system determines that the condensate is completely discharged when a water level of the water trap becomes lower than a reference valve, and then maintains the discharge valve in an open state for a reference time to perform hydrogen purge. In this case, when the condensate is not properly discharged, a flooding phenomenon in which the condensate flows into the stack occurs, which adversely affects the performance and durability of the fuel cell.

In general, the fuel cell system has a hall sensor to detect an opening state and a closing state of the discharge valve, and the hall sensor has a problem in that the hall sensor cannot accurately detect an opening time point and a closing time point of the discharge valve due to poor ground connection (GND) located inside a vehicle.

Contents described in the background art are made to promote understanding of the background of the disclosure and may include contents that are not the related art already known to those skilled in the art to which this technology belongs.

SUMMARY

An aspect of the present disclosure provides a valve opening/closing detection device for a fuel cell system, which detects a current (current waveform) supplied to a valve of a fuel cell system, determines a differential value of the current, detects opening/closing of the valve on the basis of a fluctuation range of the differential value, and thus may accurately detect an opening time point and a closing time point of the valve without a separate sensor, and a method therefor.

The purposes of the present disclosure may be not limited to the purposes described above, and other purposes and advantages of the present disclosure that are not described may be understood by the following description and may be more clearly understood by embodiments of the present disclosure. Further, it may be easily identified that the purposes and advantages of the present disclosure may be implemented by units and combinations thereof described in the appended claims.

According to an aspect of the present disclosure, there is provided a valve opening/closing detection device for a fuel cell system, the device including a current sensor that measures a current applied to a valve, and a controller that determines a differential value of the current and detect opening/closing of the valve on the basis of a fluctuation range of the differential value.

In an embodiment of the present disclosure, the controller may determine that the valve is opened when a section in which the differential value of the current is increased occurs as a primary condition, when a section in which the differential value of the current is decreased then occurs as a secondary condition, and when a section in which differential values smaller than zero among the differential values of the current are distributed then occurs as a tertiary condition.

In an embodiment of the present disclosure, the controller may determine that the valve is opened when a section in which the differential value of the current is increased occurs as a primary condition, when a section in which the differential value of the current is decreased then occurs as a secondary condition, when a section in which differential values smaller than zero among the differential values of the current are distributed then occurs as a tertiary condition, and when a concentration of hydrogen of an anode is then increased as a quaternary condition.

In an embodiment of the present disclosure, the controller may estimate the concentration of the hydrogen of the anode on the basis of a table in which a hydrogen concentration value corresponding to a pressure of the hydrogen supplied to the anode and a time when the hydrogen is supplied to the anode is recorded.

In an embodiment of the present disclosure, the controller may determine that the valve is opened when a section in which the differential value of the current is increased occurs as a primary condition, when a section in which the differential value of the current is decreased then occurs as a secondary condition, when a section in which differential values smaller than zero among the differential values of the current are distributed then occurs as a tertiary condition, and when a pressure of the valve at an input end is then decreased as a quaternary condition.

In an embodiment of the present disclosure, the controller may determine that the valve is closed when a section in which the differential value of the current is decreased occurs as a primary condition, when a section in which the differential value of the current is increased then occurs as a secondary condition, and when a section in which differential values greater than zero among the differential values of the current are distributed then occurs as a tertiary condition.

In an embodiment of the present disclosure, the controller may determine that the valve is closed when a section in which the differential value of the current is decreased occurs as a primary condition, when a section in which the differential value of the current is increased then occurs as a secondary condition, when a section in which differential values greater than zero among the differential values of the current are distributed then occurs as a tertiary condition, and when a concentration of hydrogen of an anode is then decreased as a quaternary condition.

In an embodiment of the present disclosure, the controller may estimate the concentration of the hydrogen of the anode on the basis of a table in which a hydrogen concentration value corresponding to a pressure of the hydrogen supplied to the anode and a time when the hydrogen is supplied to the anode is recorded.

In an embodiment of the present disclosure, the controller may determine that the valve is closed when a section in which the differential value of the current is decreased occurs as a primary condition, when a section in which the differential value of the current is increased then occurs as a secondary condition, when a section in which differential values greater than zero among the differential values of the current are distributed then occurs as a tertiary condition, and when a pressure of the valve at an input end is then increased as a quaternary condition.

In an embodiment of the present disclosure, the controller may filter noise included in the differential value of the current.

In an embodiment of the present disclosure, the valve may be a valve that purges hydrogen of a fuel cell stack.

According to an aspect of the present disclosure, there is provided a valve opening/closing detection method for a fuel cell system, the method including measuring, by a current sensor, a current applied to a valve, determining, by a controller, a differential value of the current, and detecting opening/closing of the valve based on a fluctuation range of the differential value.

In an embodiment of the present disclosure, the detecting of the opening/closing of the valve may include detecting a section in which the differential value of the current is increased as a primary condition, then detecting a section in which the differential value of the current is decreased as a secondary condition, then detecting a section in which differential values smaller than zero among the differential values of the current are distributed as a tertiary condition, and determining that the valve is opened.

In an embodiment of the present disclosure, the detecting of the opening/closing of the valve may include detecting a section in which the differential value of the current is increased as a primary condition, then detecting a section in which the differential value of the current is decreased as a secondary condition, then detecting a section in which differential values smaller than zero among the differential values of the current are distributed as a tertiary condition, then detecting an increase in a concentration of hydrogen of an anode as a quaternary condition, and determining that the valve is opened.

In an embodiment of the present disclosure, the detecting of the increase in the concentration of the hydrogen of the anode may include estimating the concentration of the hydrogen of the anode on the basis of a table in which a hydrogen concentration value corresponding to a pressure of the hydrogen supplied to the anode and a time when the hydrogen is supplied to the anode is recorded.

In an embodiment of the present disclosure, the detecting of the opening/closing of the valve may include detecting a section in which the differential value of the current is decreased as a primary condition, then detecting a section in which the differential value of the current is increased as a secondary condition, then detecting a section in which differential values greater than zero among the differential values of the current are distributed as a tertiary condition, and determining that the valve is closed.

In an embodiment of the present disclosure, the detecting of the opening/closing of the valve may include detecting a section in which the differential value of the current is increased as a primary condition, then detecting a section in which the differential value of the current is increased as a secondary condition, then detecting a section in which differential values greater than zero among the differential values of the current are distributed as a tertiary condition, then detecting a decrease in a concentration of hydrogen of an anode as a quaternary condition, and determining that the valve is closed.

In an embodiment of the present disclosure, the detecting of the decrease in the concentration of the hydrogen of the anode may include estimating the concentration of the hydrogen of the anode on the basis of a table in which a hydrogen concentration value corresponding to a pressure of the hydrogen supplied to the anode and a time when the hydrogen is supplied to the anode is recorded.

In an embodiment of the present disclosure, the determining of the differential value of the current may include filtering noise included in the differential value of the current.

As discussed, the method and system suitably include use of a controller or processor.

In another embodiment, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
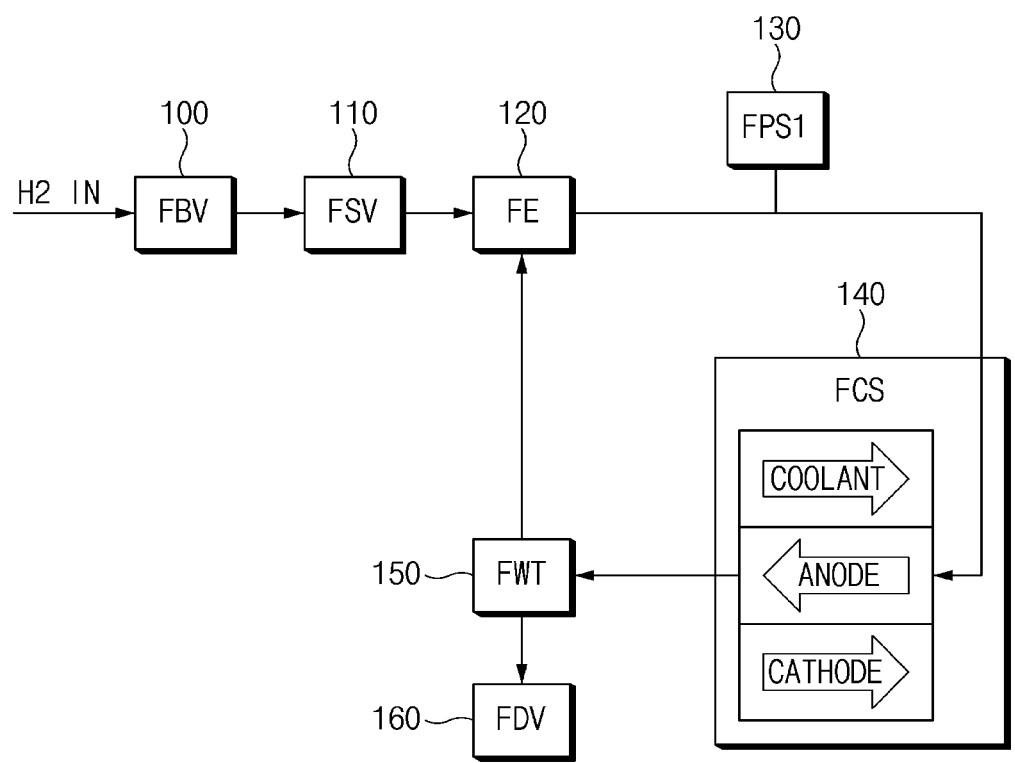
FIG. 1 is an exemplary view of a fuel cell system to which the present disclosure is applied.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is an exemplary view of a fuel cell system to which the present disclosure is applied.

As illustrated in FIG. 1, the fuel cell system to which the present disclosure is applied may include a fuel block valve (FBV) 100, a fuel supply valve (FSV) 110, a fuel ejector (FE) 120, a fuel pressure sensor 1 (FPS1) 130, a fuel cell stack (FCS) 140, a fuel line water trap (FWT) 150, a fuel line drain valve (FDV) 160, and the like.

The FBV 100 serves to block hydrogen supplied to the FCS 140.

The FSV 110 serves to adjust the pressure of the hydrogen supplied to the FCS 140.

The FE 120 serves to supply a recirculating gas to the FCS 140.

The FPS1 130 serves as a first pressure sensor and serves to measure the pressure of the hydrogen supplied to the FCS 140. Hereinafter, the role of the FPS1 130 will be described in more detail.

When the FDV 160 is opened, since the pressure at an output end of the FE 120 and the pressure at an input end of the FDV 160 are equal to each other, the pressure measured by the FPS1 130 is the pressure at the input end of the FDV 160. In this way, the pressure measured by the FPS1 130 may be used to measure the concentration of the hydrogen. For example, the concentration of the hydrogen may be estimated through the pressure of the hydrogen supplied to the anode and time. Further, the opening/closing of the FDV 160 may be identified through the pressure at the input end of the FDV 160. For example, when the FDV 160 is opened, the pressure is instantaneously decreased, and when the FDV 160 is closed, the pressure is instantaneously increased. Meanwhile, a method of identifying the opening/closing of the FDV 160 through the pressure measured by the FPS1 130 in addition to a method of controlling an opening state of the FDV 160 through a current measured by a current sensor may improve accuracy.

The FCS 140 generates electricity using a chemical reaction of hydrogen and oxygen.

The FWT 150 serves to store a condensate of the anode.

The FDV 160 as an anode discharge valve serves to discharge the condensate (water) stored in the FWT 150 and also serves to purge the hydrogen of the FCS 140. The FDV 160 may be implemented as a solenoid valve.

Figure 2:
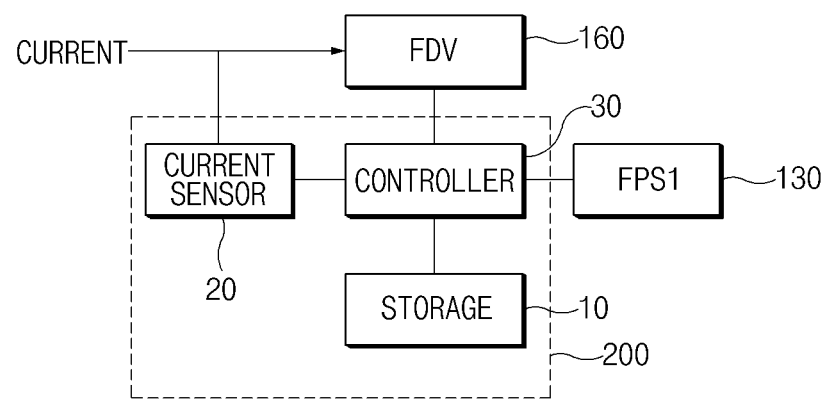
FIG. 2 is a diagram illustrating a valve opening/closing detection device for a fuel cell system according to an embodiment of the present disclosure.

FIG. 2 is a diagram illustrating a valve opening/closing detection device for a fuel cell system according to an embodiment of the present disclosure, wherein the valve includes the FBV 100, the FSV 110, the FDV 160, or the like, but the FDV 160 will be described below as an example.

As illustrated in FIG. 2, a valve opening/closing detection device 200 for a fuel cell system according to an embodiment of the present disclosure may include storage 10, a current sensor 20, and a controller 30. In this case, according to a method of implementing the valve opening/closing detection device 200 for a fuel cell system according to an embodiment of the present disclosure, respective components may be combined with each other to be implemented as one component or some components may be omitted.

In description of the respective components, first, the storage 10 may store various logics, algorithms, and programs required in a process of detecting a current (for example, a current waveform) supplied to the FDV 160 of the fuel cell system, determining a differential value of the current, and detecting the opening/closing of the FDV 160 on the basis of a fluctuation range of the differential value.

The storage 10 may store a first minimum threshold and a first maximum threshold that are first thresholds used for determining the opening of the FDV 160 and form the fluctuation range of the differential value. Here, the first minimum threshold may be set to a value (for example, −0.01) smaller than zero, and the first maximum threshold may be set to a value (for example, 0.14) greater than zero.

The storage 10 may store a second minimum threshold and a second maximum threshold that are second thresholds used for determining the closing of the FDV 160 and form the fluctuation range of the differential value. Here, the second minimum threshold may be set to a value (for example, −0.14) smaller than zero, and the second maximum threshold may be set to a value (for example, 0.01) greater than zero.

The storage 10 may store a table in which the pressure of the hydrogen supplied to the anode of the FCS 140 and the concentration of the hydrogen corresponding to a time period during which the hydrogen is supplied to the anode are recorded. The table may be used to measure the concentration of the hydrogen of the anode.

The storage 10 may include at least one of storage medium among a flash memory, a hard disk type memory, a micro type memory, a card type memory (for example, a secure digital (SD) card or an extreme digital (XI)) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The current sensor 20 may measure a current applied to the FDV 160. The current sensor 20 may measure a current of the FBV 100 or measure a current of the FSV 110.

The controller 30 may perform overall control so that the respective components may normally perform functions thereof. The controller 30 may be implemented in the form of hardware, may be implemented in the form of software, or may be implemented in the form in which the hardware and the software are combined. It is preferable that the controller 30 may be implemented as a microprocessor, but the present disclosure is not limited thereto.

In particular, the controller 30 may perform various controls in a process of detecting the current (for, the current waveform) supplied to the FDV 160 of the fuel cell system, determining the differential value of the current, and detecting the opening/closing of the FDV 160 on the basis of the fluctuation range of the differential value. In this case, the controller 30 may detect whether the FDV 160 is actually opened in a state in which a driving voltage is applied to the FDV 160 or the FDV 160 is actually closed in a state in which the driving voltage is cut off to the FDV 160.

The controller 30 may determine 10 consecutive differential values among differential values of the current as one data set, compare the first five differential values and the latter five differential values in the one data set, and detect the opening/closing of the FDV 160 on the basis of the comparison result.

The controller 30 may perform filtering to remove noise included in the differential values of the current. To this end, the controller 30 may use, for example, a moving average algorithm.

Hereinafter, a process of detecting, by the controller 30, the opening/closing of the FDV 160 will be described in detail with reference to FIGS. 3 to 7.

Figure 3:
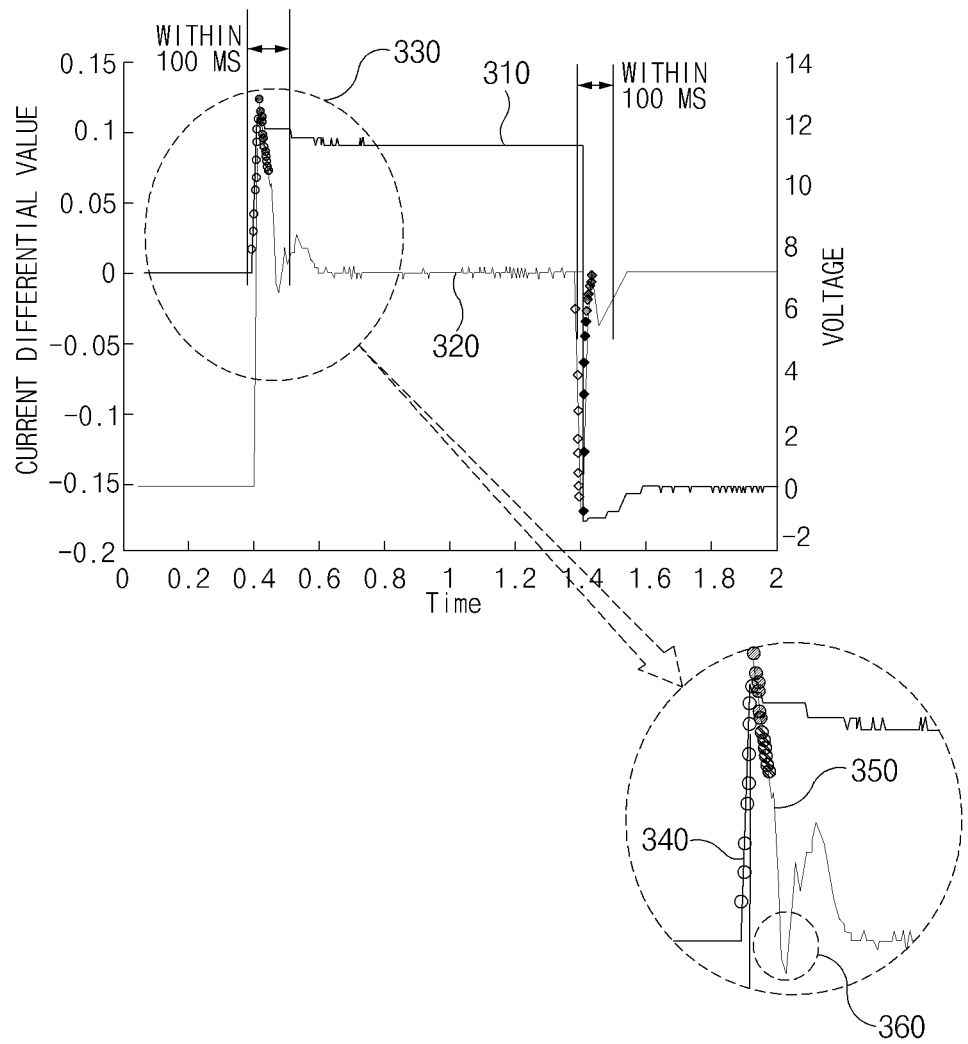
FIG. 3 is an exemplary view illustrating a process in which a controller provided in the valve opening/closing detection device for a fuel cell system according to an embodiment of the present disclosure determines that a fuel line drain valve (FDV) is opened.

FIG. 3 is an exemplary view illustrating a process in which the controller provided in the valve opening/closing detection device for a fuel cell system according to an embodiment of the present disclosure determines that the FDV is opened.

In FIG. 3, a horizontal axis denotes a time, a left vertical axis denotes the differential value of the current applied to the FDV 160, a right vertical axis denotes a voltage applied to the FDV 160, reference numeral "310" is a graph depicting a voltage applied to the FDV 160, reference numeral "320" is a graph depicting the differential value of the current applied to the FDV 160, and reference numeral "330" is an interest region used for detecting the opening of the FDV 160. In this case, the interest region may be set as, for example, 100 ms. For reference, in the interest region, data (for example, the differential value of the current) may be collected, for example, at a period of 1 ms.

In consideration of the fact that the current applied to the FDV 160 is increased as the voltage is applied to the FDV 160 and accordingly, the differential value of the current applied to the FDV 160 is also increased, the controller 30 may monitor whether a section 340 in which the differential value of the current is increased as a primary condition occurs. In this case, the controller 30 may determine that the primary condition is satisfied when the preset number of differential values are continuously greater than zero.

Thereafter, in consideration of a decrease in the current applied to the FDV 160 due to a counter-electromotive force, the controller 30 may monitor whether a section 350 in which the differential value of the current is decreased occurs as a secondary condition. In this case, the controller 30 may determine that the secondary condition is satisfied when the sum of the first five differential values is greater than the sum of the latter five differential values. Here, the number of the differential values may be changed according to an intention of a designer.

Thereafter, in consideration of the fact that the differential value of the current is increased again as the decrease in the current due to the counter-electromotive force disappears and an influence of an inflection point of a current waveform, the controller 30 may monitor whether a section 360 in which differential values smaller than zero among the differential values of the current are distributed occurs as a tertiary condition. In this case, the controller 30 may determine that the tertiary condition is satisfied when the preset number of differential values are smaller than zero. Here, a differential value of the preset number is a continuous value.

Thereafter, the controller 30 may determine that the FDV 160 is opened when the primary condition, the secondary condition, and the tertiary condition are sequentially satisfied.

In addition, a quaternary condition may be further considered after the primary condition, the secondary condition, and the tertiary condition. As a first embodiment, the controller 30 may monitor whether the concentration of the hydrogen of the anode is increased as the quaternary condition. In this case, the controller 30 may determine that the quaternary condition is satisfied when the concentration of the hydrogen of the anode is increased. In this way, when the primary condition, the secondary condition, the tertiary condition, and the quaternary condition are sequentially satisfied, the controller 30 may finally determine that the FDV 160 is opened. As a second embodiment, the controller 30 may monitor a change in pressure at an input end of the FDV 160 measured by the FPS1 130 as the quaternary condition. In this case, the controller 30 may determine that the quaternary condition is satisfied when the pressure is instantaneously decreased. In this way, when the primary condition, the secondary condition, the tertiary condition, and the quaternary condition are sequentially satisfied, the controller 30 may finally determine that the FDV 160 is opened.

Figure 4:
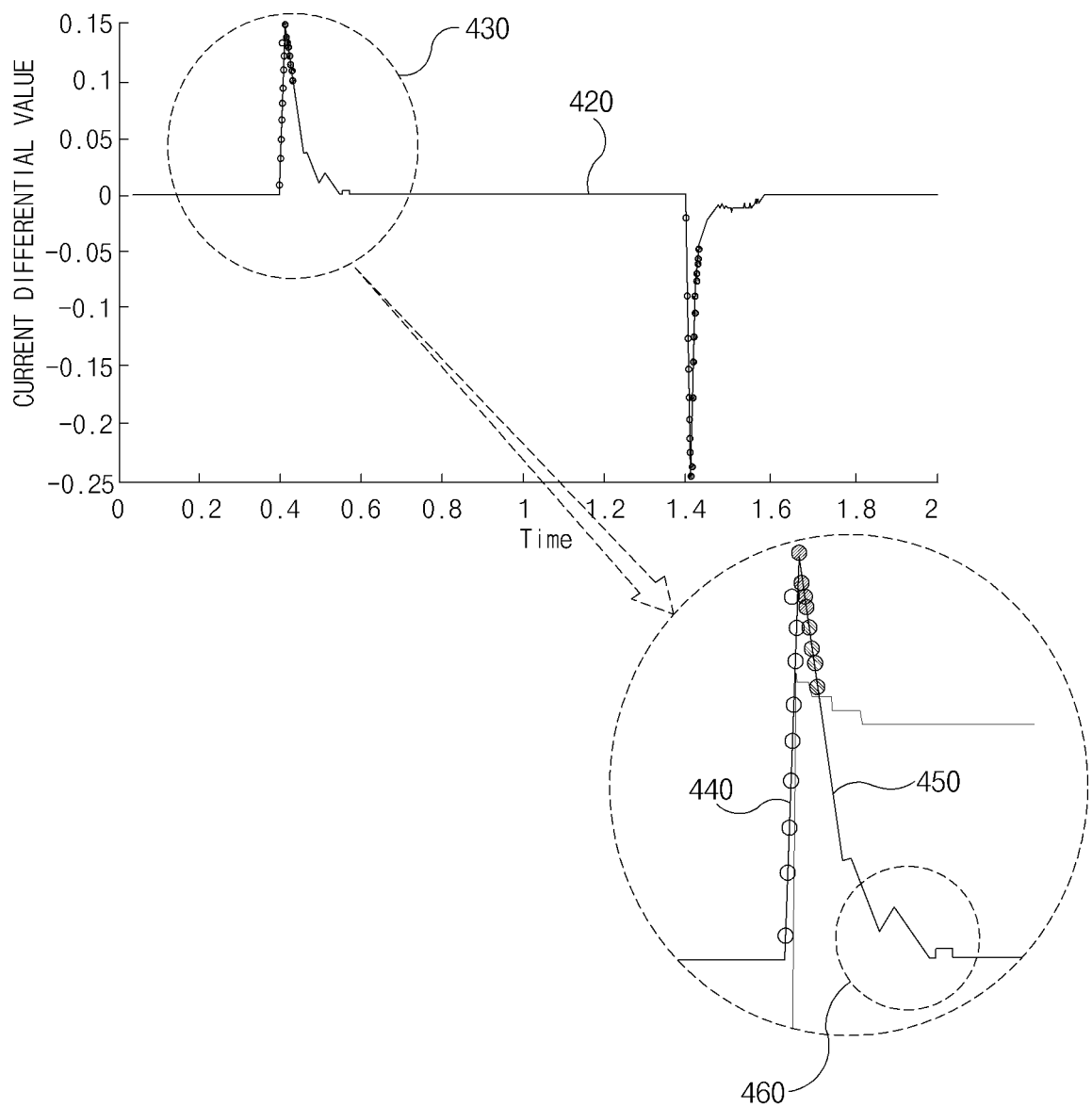
FIG. 4 is an exemplary view illustrating a process in which the controller provided in the valve opening/closing detection device for a fuel cell system according to an embodiment of the present disclosure determines that the FDV is not opened.

FIG. 4 is an exemplary view illustrating a process in which the controller provided in the valve opening/closing detection device for a fuel cell system according to an embodiment of the present disclosure determines that the FDV is not opened.

In FIG. 4, a horizontal axis denotes a time, a vertical axis denotes the differential value of the current applied to the FDV 160, reference numeral "420" is a graph depicting the differential value of the current applied to the FDV 160, and reference numeral "430" is an interest region used for detecting the opening of the FDV 160. In this case, the interest region may be set as, for example, 100 ms. For reference, in the interest region, data (for example, the differential value of the current) may be collected, for example, at a period of 1 ms.

The controller 30 may detect a section 440 in which the differential value of the current is increased as the primary condition. That is, the controller 30 may determine that the primary condition is satisfied because the preset number of the differential values are continuously greater than zero.

Thereafter, the controller 30 may detect a section 450 in which the differential value of the current is decreased as the secondary condition. That is, the controller 30 determines that the secondary condition is satisfied because the sum of the first five differential values is greater than the sum of the latter five differential values.

Thereafter, the controller 30 may not detect a section in which a differential value less than zero among the differential value of the current is distributed. Reference numeral "460" is not a section in which the differential value less than zero among the differential values of the current is distributed. That is, the tertiary condition is not satisfied.

Thus, the controller 30 may determine that the FDV 160 is not opened because the tertiary condition is not satisfied. This means that the FDV 160 is not normally operated.

Figure 5:
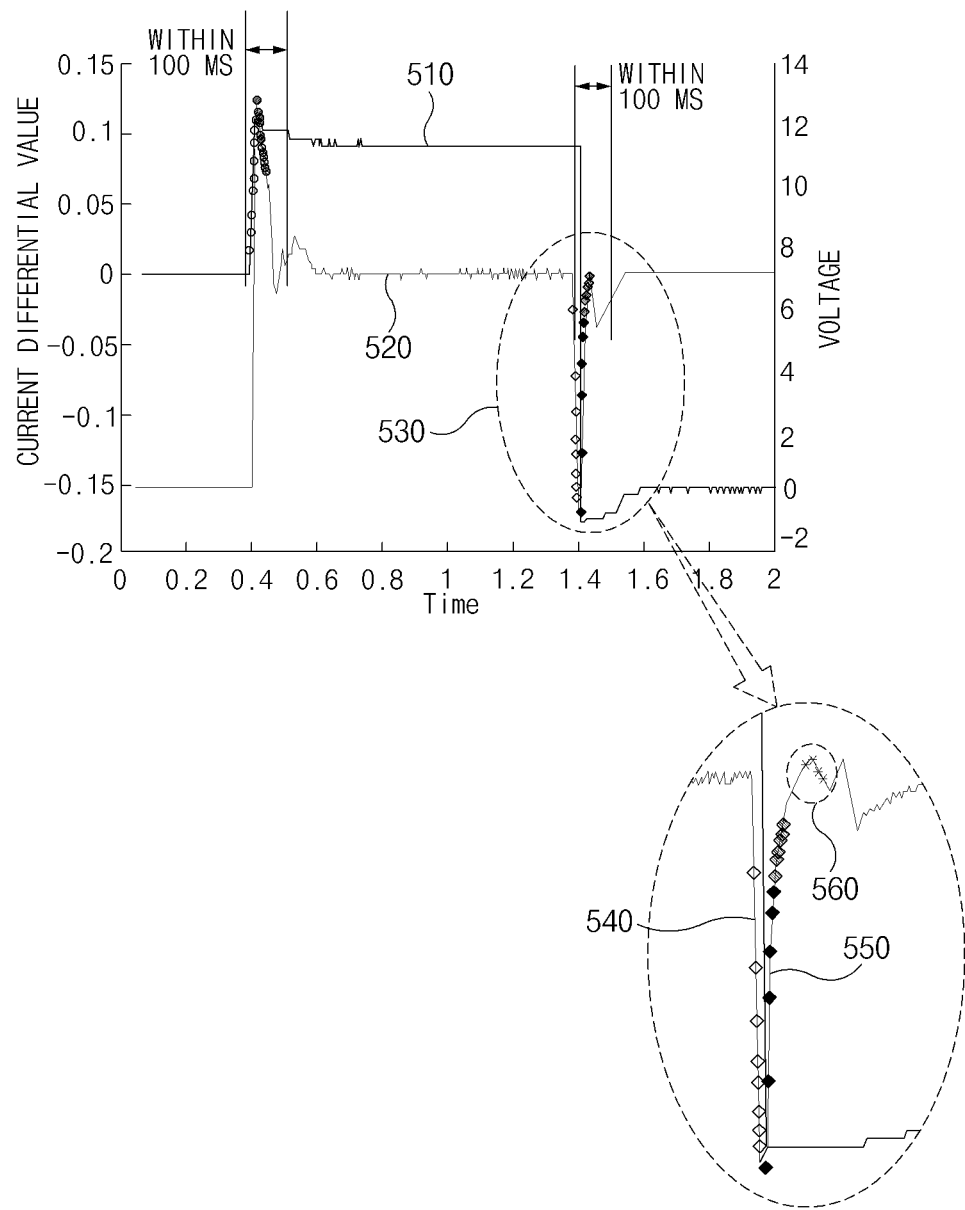
FIG. 5 is an exemplary view illustrating a process in which the controller provided in the valve opening/closing detection device for a fuel cell system according to an embodiment of the present disclosure determines that the FDV is closed.

FIG. 5 is an exemplary view illustrating a process in which the controller provided in the valve opening/closing detection device for a fuel cell system according to an embodiment of the present disclosure determines that the FDV is closed.

In FIG. 5, a horizontal axis denotes a time, a left vertical axis denotes the differential value of the current applied to the FDV 160, a right vertical axis denotes a voltage applied to the FDV 160, reference numeral "510" is a graph depicting a voltage applied to the FDV 160, reference numeral "520" is a graph depicting the differential value of the current applied to the FDV 160, and reference numeral "530" is an interest region used for detecting the closing of the FDV 160. In this case, the interest region may be set as, for example, 100 ms. For reference, in the interest region, data (for example, the differential value of the current) may be collected, for example, at a period of 1 ms.

In consideration of the fact that the current applied to the FDV 160 is decreased as the voltage is cut off to the FDV 160 and accordingly, the differential value of the current applied to the FDV 160 is also decreased, the controller 30 may monitor whether a section 540 in which the differential value of the current is decreased as the primary condition occurs. In this case, the controller 30 may determine that the primary condition is satisfied when the preset number of differential values are continuously less than zero.

Thereafter, in consideration of an increase in the current applied to the FDV 160 due to a counter-electromotive force, the controller 30 may monitor whether a section 550 in which the differential value of the current is increased occurs as a secondary condition. In this case, the controller 30 may determine that the secondary condition is satisfied when the sum of the first five differential values is less than the sum of the latter five differential values. Here, the number of the differential values may be changed according to an intention of a designer.

Thereafter, in consideration of the fact that the differential value of the current is decreased again as the increase in the current due to the counter-electromotive force disappears and an influence of an inflection point of a current waveform, the controller 30 may monitor whether a section 560 in which differential values greater than zero among the differential values of the current are distributed occurs as the tertiary condition. In this case, the controller 30 may determine that the tertiary condition is satisfied when the preset number of differential values are greater than zero. Here, a differential value of the preset number is a continuous value.

Thereafter, the controller 30 may determine that the FDV 160 is closed when the primary condition, the secondary condition, and the tertiary condition are sequentially satisfied.

In addition, a quaternary condition may be further considered after the primary condition, the secondary condition, and the tertiary condition. As a first embodiment, the controller 30 may monitor whether the concentration of the hydrogen of the anode is decreased as the quaternary condition. In this case, the controller 30 may determine that the quaternary condition is satisfied when the concentration of the hydrogen of the anode is decreased. In this way, when the primary condition, the secondary condition, the tertiary condition, and the quaternary condition are sequentially satisfied, the controller 30 may finally determine that the FDV 160 is closed. As a second embodiment, the controller 30 may monitor a change in pressure at an input end of the FDV 160 measured by the FPS1 130 as the quaternary condition. In this case, the controller 30 may determine that the quaternary condition is satisfied when the pressure is instantaneously increased. In this way, when the primary condition, the secondary condition, the tertiary condition, and the quaternary condition are sequentially satisfied, the controller 30 may finally determine that the FDV 160 is closed.

Figure 6:
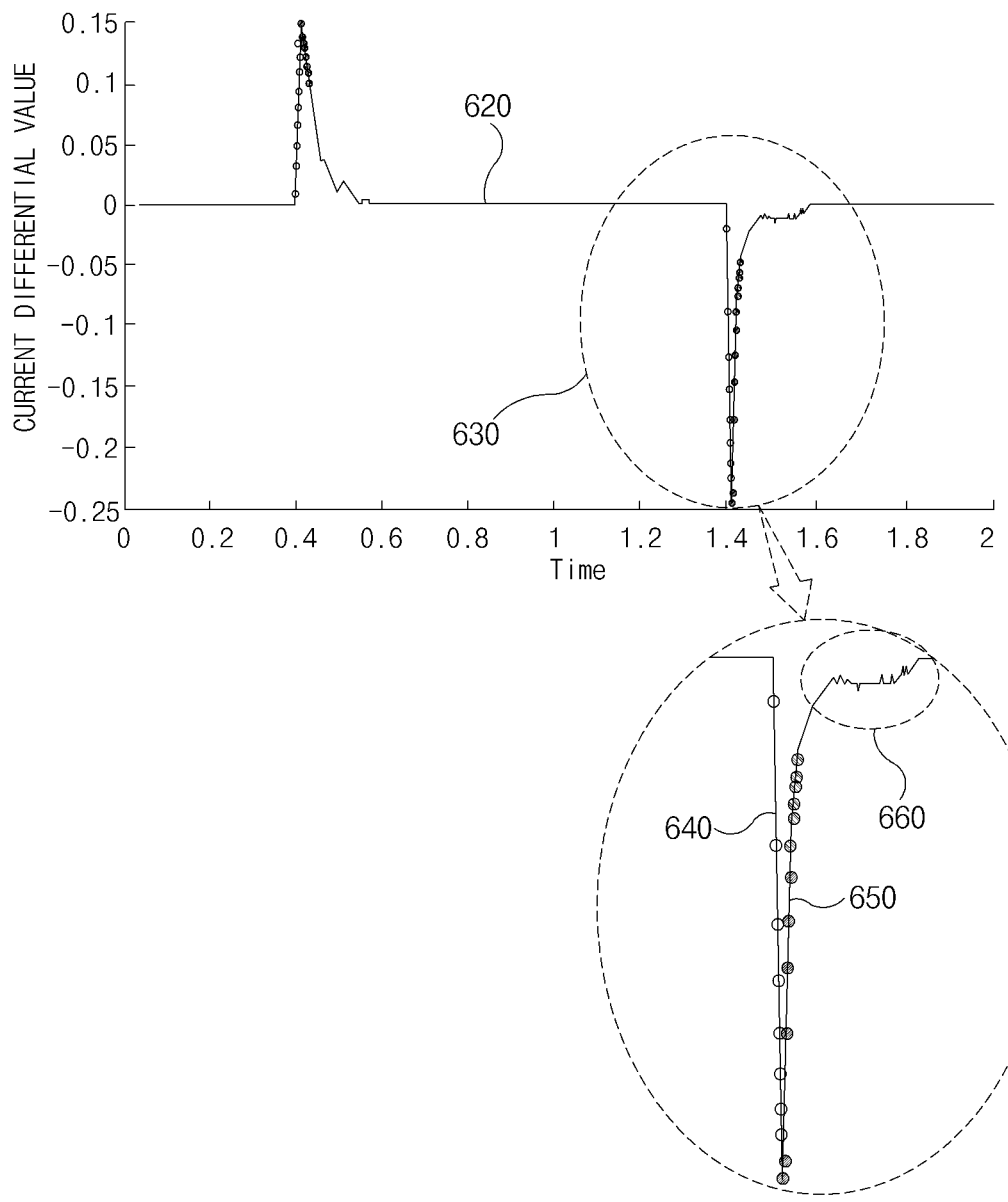
FIG. 6 is an exemplary view illustrating a process in which the controller provided in the valve opening/closing detection device for a fuel cell system according to an embodiment of the present disclosure determines that the FDV is not closed.

FIG. 6 is an exemplary view illustrating a process in which the controller provided in the valve opening/closing detection device for a fuel cell system according to an embodiment of the present disclosure determines that the FDV is not closed.

In FIG. 6, a horizontal axis denotes a time, a vertical axis denotes the differential value of the current applied to the FDV 160, reference numeral "620" is a graph depicting the differential value of the current applied to the FDV 160, and reference numeral "630" is an interest region used for detecting the closing of the FDV 160. In this case, the interest region may be set as, for example, 100 ms. For reference, in the interest region, data (for example, the differential value of the current) may be collected, for example, at a period of 1 ms.

The controller 30 may detect a section 640 in which the differential value of the current is decreased as the primary condition. That is, the controller 30 may determine that the primary condition is satisfied because the preset number of the differential values are continuously less than zero.

Thereafter, the controller 30 may detect a section 650 in which the differential value of the current is increased as the secondary condition. That is, the controller 30 may determine that the secondary condition is satisfied because the sum of the first five differential values is less than the sum of the latter five differential values.

Thereafter, the controller 30 may not detect a section in which a differential value greater than zero among the differential values of the current is distributed. Reference numeral "660" is not a section in which the differential value less than zero among the differential values of the current is distributed. That is, the tertiary condition is not satisfied.

Thus, the controller 30 may determine that the FDV 160 is not closed because the tertiary condition is not satisfied. This means that the FDV 160 is not normally operated.

Figure 7:
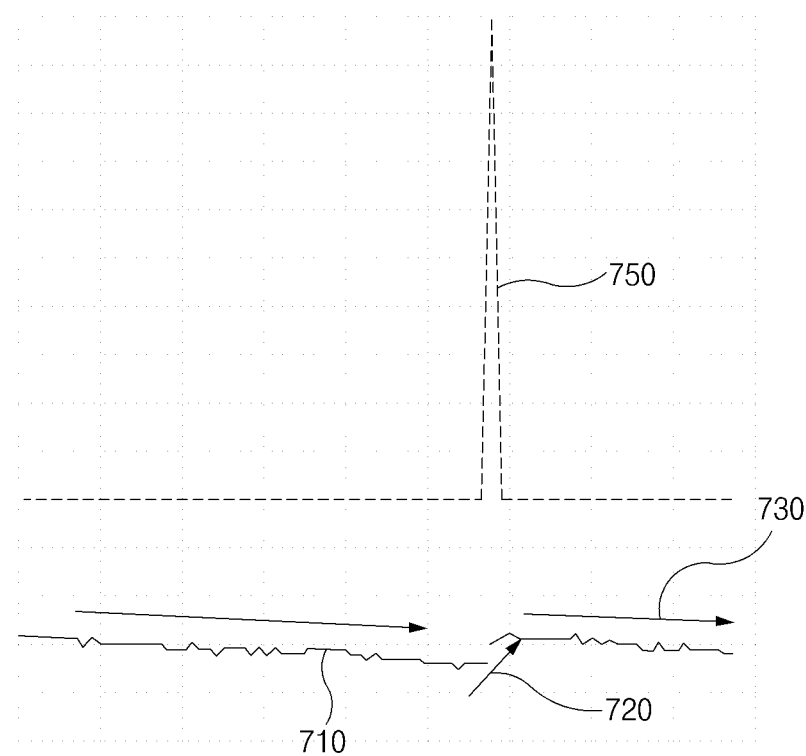
FIG. 7 is an exemplary view of a quaternary condition used by the controller provided in the valve opening/closing detection device for a fuel cell system according to an embodiment of the present disclosure to detect the opening/closing of the FDV.

FIG. 7 is an exemplary view of a quaternary condition used by the controller provided in the valve opening/closing detection device for a fuel cell system according to an embodiment of the present disclosure to detect the opening/closing of the FDV.

In FIG. 7, reference numeral "750" denotes an opening/closing command ON/OFF, and reference numeral "710" denotes the concentration of the hydrogen of the anode. Here, in a state in which the FDV 160 is opened, the FSV 110 is operated to compensate for a pressure decrease of the anode, and as the FSV 110 is opened, the concentration of the hydrogen of the anode is increased (720). Further, in a state in which the FDV 160 is closed, the concentration of the hydrogen of the anode is decreased as hydrogen, nitrogen, and impurities recirculate or the concentration of the hydrogen of the anode is decreased as the hydrogen of the anode is used for power generation (730).

Thus, according to the quaternary condition, the controller 30 may determine that the FDV 160 is opened when the concentration of the hydrogen of the anode is increased and determine that the FDV 160 is closed when the concentration of the hydrogen of the anode is decreased.

Here, the controller 30 may, on the basis of the table stored in the storage 10, estimate the concentration of the hydrogen corresponding to the pressure of the hydrogen supplied to the anode of the FCS 140 and a time during which the hydrogen is supplied to the anode. Further, the controller 30 may be provided with a separate sensor that measures the concentration of the hydrogen of the anode and thus directly measure the concentration of the hydrogen.

Figure 8:
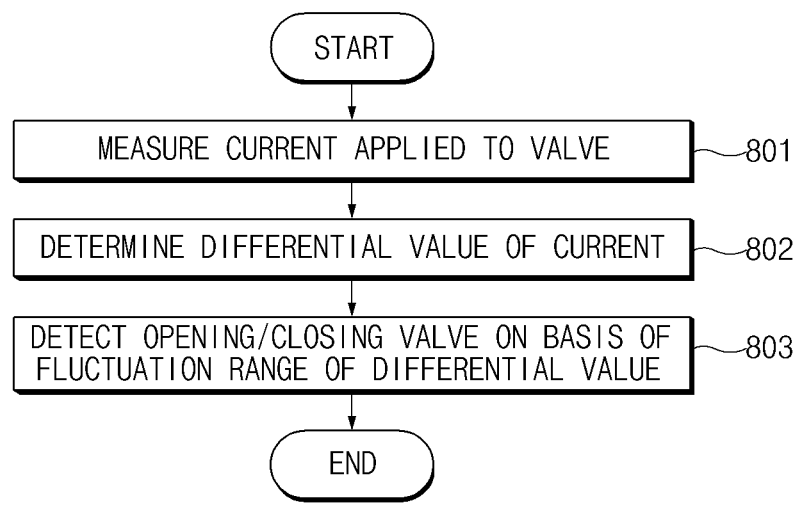
FIG. 8 is a flowchart illustrating a valve opening/closing detection method for a fuel cell system according to an embodiment of the present disclosure.

FIG. 8 is a flowchart illustrating a valve opening/closing detection method for a fuel cell system according to an embodiment of the present disclosure.

First, the current sensor 20 measures a current applied to a valve (801).

Thereafter, the controller 30 determines the differential value of the current (802).

Thereafter, the controller 30 detects the opening/closing of the valve on the basis of the fluctuation range of the differential value (803).

Figure 9:
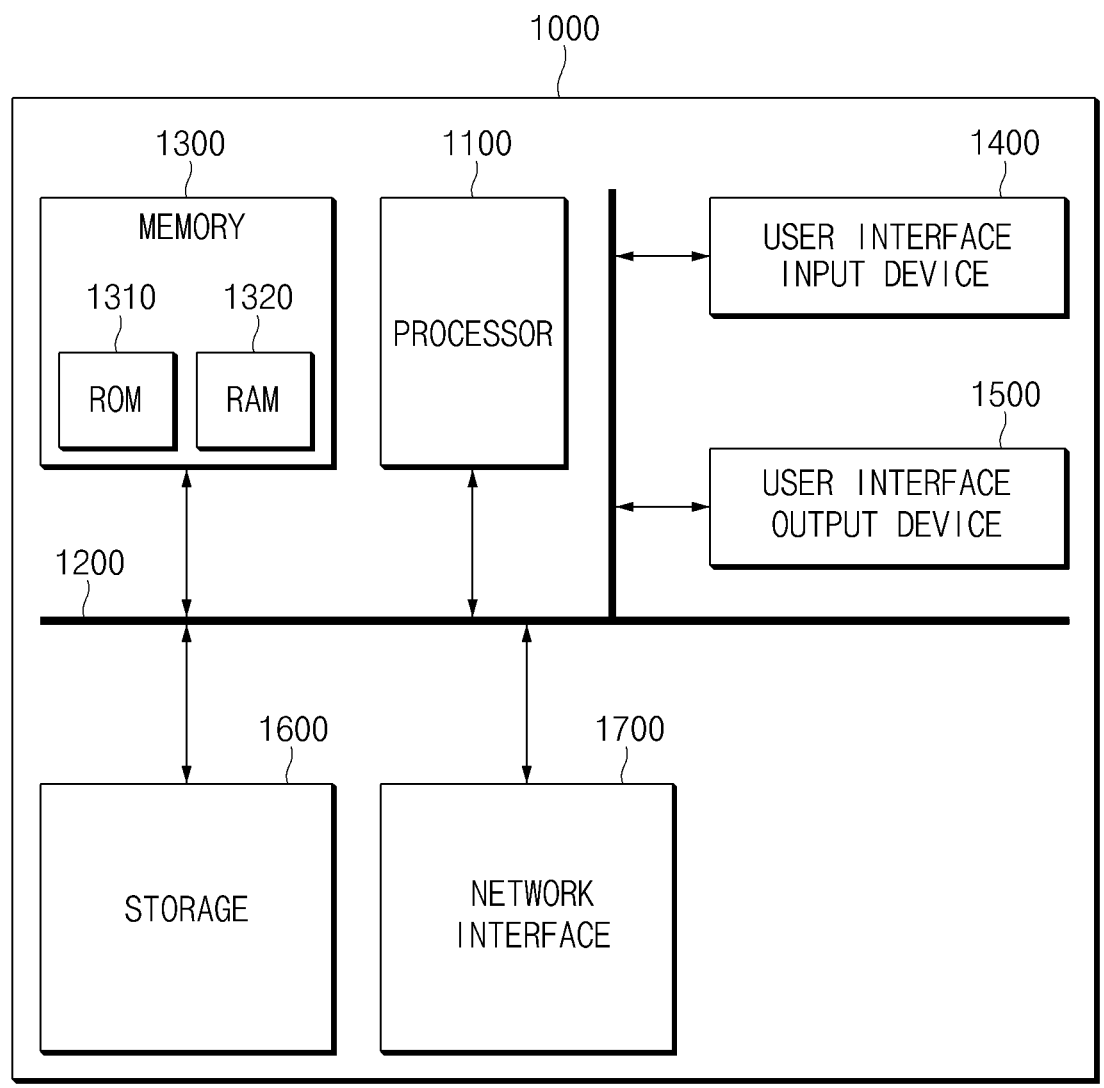
FIG. 9 is a block diagram illustrating a computing system for executing the valve opening/closing detection method for a fuel cell system according to an embodiment of the present disclosure.

FIG. 9 is a block diagram illustrating a computing system for executing the valve opening/closing detection method for a fuel cell system according to an embodiment of the present disclosure.

Referring to FIG. 9, the above-described the valve opening/closing detection method for a fuel cell system according to an embodiment of the present disclosure may be implemented even through a computing system. A computing system 1000 may include at least one processor 1100, a memory 1300, a user interface input device 1400, a user interface output device 1500, storage 1600, and a network interface 1700, which are connected through a system bus 1200.

The processor 1100 may be a central processing unit (CPU) or a semiconductor device that processes commands stored in the memory 1300 and/or the storage 1600. The memory 1300 and the storage 1600 may include various types of volatile or nonvolatile storage media. For example, the memory 1300 may include a ROM 131 and a RAM 1320.

Thus, operations of a method or algorithm described in connection with the embodiments disclosed herein may be directly implemented in hardware, a software module, or a combination of the two components, which are executed by the processor 1100. The software module may reside in a storage medium (that is, the memory 1300 and/or the storage 1600) such as a RAM, a flash memory, a ROM, an EPROM, an EFPROM, a register, a hard disk, a solid state drive (SSD), a removable disk, and a compact disk (CD)-ROM. An exemplary storage medium may be coupled to the processor 1100, and the processor 1100 may read information from the storage medium and write information in the storage medium. In another manner, the storage medium may be integrated with the processor 1100. The processor and the storage medium may reside inside an application-specific integrated circuit (ASIC). The ASIC may reside inside a user terminal. In still another manner, the processor and the storage medium may reside as an individual component inside the user terminal.

A valve opening/closing detection device for a fuel cell system and a method therefor according to an embodiment of the present disclosure may detect a current (current waveform) supplied to a valve of a fuel cell system, determine a differential value of the current, detect opening/closing of the valve on the basis of a fluctuation range of the differential value, and thus may accurately detect an opening time point and a closing time point of the valve without a separate sensor.

The above description is merely illustrative of the technical spirit of the present disclosure, and those skilled in the art to which the present disclosure belongs may make various modifications and changes without departing from the essential features of the present disclosure.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A valve opening/closing detection device for a fuel cell system, the device comprising:
   a current sensor configured to measure a current applied to a valve; and
   a controller configured to determine a differential value of the current and detect opening/closing of the valve based on a fluctuation range of the differential value.

2. The device of claim 1, wherein the controller determines that the valve is opened:
   when a section in which the differential value of the current is increased occurs as a primary condition,
   when a section in which the differential value of the current is decreased then occurs as a secondary condition, and
   when a section in which differential values smaller than zero among the differential values of the current are distributed then occurs as a tertiary condition.

3. The device of claim 1, wherein the controller determines that the valve is opened:
   when a section in which the differential value of the current is increased occurs as a primary condition,
   when a section in which the differential value of the current is decreased then occurs as a secondary condition,
   when a section in which differential values smaller than zero among the differential values of the current are distributed then occurs as a tertiary condition, and
   when a concentration of hydrogen of an anode is then increased as a quaternary condition.

4. The device of claim 3, wherein the controller estimates the concentration of the hydrogen of the anode based on a table in which a hydrogen concentration value corresponding to a pressure of the hydrogen supplied to the anode and a time when the hydrogen is supplied to the anode is recorded.

5. The device of claim 1, wherein the controller determines that the valve is opened:
   when a section in which the differential value of the current is increased occurs as a primary condition,
   when a section in which the differential value of the current is decreased then occurs as a secondary condition,
   when a section in which differential values smaller than zero among the differential values of the current are distributed then occurs as a tertiary condition, and
   when a pressure of the valve at an input end is then decreased as a quaternary condition.

6. The device of claim 1, wherein the controller determines that the valve is closed:
   when a section in which the differential value of the current is decreased occurs as a primary condition,
   when a section in which the differential value of the current is increased then occurs as a secondary condition, and
   when a section in which differential values greater than zero among the differential values of the current are distributed then occurs as a tertiary condition.

7. The device of claim 1, wherein the controller determines that the valve is closed:
   when a section in which the differential value of the current is decreased occurs as a primary condition,
   when a section in which the differential value of the current is increased then occurs as a secondary condition,
   when a section in which differential values greater than zero among the differential values of the current are distributed then occurs as a tertiary condition, and
   when a concentration of hydrogen of an anode is then decreased as a quaternary condition.

8. The device of claim 7, wherein the controller estimates the concentration of the hydrogen of the anode based on a table in which a hydrogen concentration value corresponding to a pressure of the hydrogen supplied to the anode and a time when the hydrogen is supplied to the anode is recorded.

9. The device of claim 7, wherein the controller determines that the valve is closed:
   when a section in which the differential value of the current is decreased occurs as a primary condition,
   when a section in which the differential value of the current is increased then occurs as a secondary condition,
   when a section in which differential values greater than zero among the differential values of the current are distributed then occurs as a tertiary condition, and
   when a pressure of the valve at an input end is then increased as a quaternary condition.

10. The device of claim 1, wherein the controller filters noise included in the differential value of the current.

11. The device of claim 1, wherein the valve is a valve configured to purge hydrogen of a fuel cell stack.

12. A valve opening/closing detection method for a fuel cell system, the method comprising:
    measuring, by a current sensor, a current applied to a valve;
    determining, by a controller, a differential value of the current; and
    detecting, by the controller, opening/closing of the valve based on a fluctuation range of the differential value.

13. The method of claim 12, wherein the detecting of the opening/closing of the valve includes:
    detecting, by the controller, a section in which the differential value of the current is increased as a primary condition;
    then detecting, by the controller, a section in which the differential value of the current is decreased as a secondary condition;
    then detecting, by the controller, a section in which differential values smaller than zero among the differential values of the current are distributed as a tertiary condition; and
    determining that the valve is opened.

14. The method of claim 12, wherein the detecting of the opening/closing of the valve includes:
    detecting, by the controller, a section in which the differential value of the current is increased as a primary condition;

then detecting, by the controller, a section in which the differential value of the current is decreased as a secondary condition;
then detecting, by the controller, a section in which differential values smaller than zero among the differential values of the current are distributed as a tertiary condition;
then detecting, by the controller, an increase in a concentration of hydrogen of an anode as a quaternary condition; and
determining, by the controller, that the valve is opened.

15. The method of claim 14, wherein the detecting of the increase in the concentration of the hydrogen of the anode comprises estimating, by the controller, the concentration of the hydrogen of the anode based on a table in which a hydrogen concentration value corresponding to a pressure of the hydrogen supplied to the anode and a time when the hydrogen is supplied to the anode is recorded.

16. The method of claim 12, wherein the detecting of the opening/closing of the valve comprises:
    detecting, by the controller, a section in which the differential value of the current is decreased as a primary condition;
    then detecting, by the controller, a section in which the differential value of the current is increased as a secondary condition;
    then detecting, by the controller, a section in which differential values greater than zero among the differential values of the current are distributed as a tertiary condition; and
    determining, by the controller, that the valve is closed.

17. The method of claim 12, wherein the detecting of the opening/closing of the valve comprises:
    detecting, by the controller, a section in which the differential value of the current is increased as a primary condition;
    then detecting, by the controller, a section in which the differential value of the current is increased as a secondary condition;
    then detecting, by the controller, a section in which differential values greater than zero among the differential values of the current are distributed as a tertiary condition;
    then detecting, by the controller, a decrease in a concentration of hydrogen of an anode as a quaternary condition; and
    determining, by the controller, that the valve is closed.

18. The method of claim 17, wherein the detecting of the decrease in the concentration of the hydrogen of the anode comprises estimating, by the controller, the concentration of the hydrogen of the anode based on a table in which a hydrogen concentration value corresponding to a pressure of the hydrogen supplied to the anode and a time when the hydrogen is supplied to the anode is recorded.

19. The method of claim 12, wherein the determining of the differential value of the current comprises filtering, by the controller, noise included in the differential value of the current.

20. The method of claim 12, wherein the valve is a valve configured to purge hydrogen of a fuel cell stack.

* * * * *